US007963846B2

(12) United States Patent
Englman et al.

(10) Patent No.: US 7,963,846 B2
(45) Date of Patent: Jun. 21, 2011

(54) GAMING MACHINE HAVING MULTIPLE LEVEL PROGRESSIVE FEATURE WITH PLAYER CONTROLLED OUTCOME

(75) Inventors: Allon G. Englman, Chicago, IL (US); Larry J. Pacey, Evanston, IL (US); Joel R. Jaffe, Evanston, IL (US)

(73) Assignee: WMS Gaming Inc., Waukegan, IL (US)

( * ) Notice: Subject to any disclaimer, the term of this patent is extended or adjusted under 35 U.S.C. 154(b) by 1842 days.

(21) Appl. No.: 10/612,806

(22) Filed: Jul. 2, 2003

(65) Prior Publication Data

US 2005/0003880 A1 Jan. 6, 2005

(51) Int. Cl.
*A63F 13/00* (2006.01)

(52) U.S. Cl. ................ 463/27; 463/16; 463/17; 463/18; 463/19; 463/20; 463/26

(58) Field of Classification Search .......... 463/1, 16–20, 463/22, 25–29, 31, 40–42
See application file for complete search history.

(56) References Cited

U.S. PATENT DOCUMENTS

| | | | | |
|---|---|---|---|---|
| 4,624,459 A | | 11/1986 | Kaufman | 273/143 R |
| 4,837,728 A | | 6/1989 | Barrie et al. | 364/412 |
| 4,861,041 A | | 8/1989 | Jones et al. | 273/292 |
| 4,948,134 A | | 8/1990 | Suttle et al. | 273/85 |
| 5,116,055 A | | 5/1992 | Tracy | 273/138 A |
| 5,249,800 A | | 10/1993 | Hilgendorf et al. | 273/138 A |
| 5,275,400 A | * | 1/1994 | Weingardt et al. | 463/12 |
| 5,280,909 A | | 1/1994 | Tracy | 273/138 A |
| 5,286,023 A | * | 2/1994 | Wood | 463/20 |
| 5,344,144 A | | 9/1994 | Canon | 273/138 A |
| 5,377,973 A | | 1/1995 | Jones et al. | 273/85 CP |
| 5,393,057 A | | 2/1995 | Marnell, II | 273/85 CP |
| 5,417,430 A | | 5/1995 | Breeding | 273/292 |
| 5,524,888 A | | 6/1996 | Heidel | 463/22 |
| 5,544,892 A | | 8/1996 | Breeding | 273/292 |
| 5,564,700 A | | 10/1996 | Celona | 463/27 |
| 5,577,959 A | | 11/1996 | Takemoto | 463/25 |

(Continued)

FOREIGN PATENT DOCUMENTS

CA 2 334 546 8/2001

(Continued)

OTHER PUBLICATIONS

Article for "Easy Riches" by Sigma Game, Strictly Slots, 1 page (Aug. 2001).

(Continued)

*Primary Examiner* — Dmitry Suhol
*Assistant Examiner* — David Duffy
(74) *Attorney, Agent, or Firm* — Nixon Peabody LLP

(57) ABSTRACT

A new type of progressive game can be used in conjunction with wagering games. A gaming terminal is capable of playing a progressive game that is triggered during or after the typical wagering game that is played at the gaming terminal. The gaming terminal includes an input device for receiving inputs from a player during the wagering game. Such inputs include a wager amount. A display displays a randomly selected outcome of the wagering game in response to receiving the wager amount from the player. In response to the progressive game being triggered, the display then displays a plurality of player-selectable game elements. The player selects one or more of the player-selectable game elements. The progressive game payoff is determined based on his or her selection.

16 Claims, 8 Drawing Sheets

U.S. PATENT DOCUMENTS

| | | | | |
|---|---|---|---|---|
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,788,573 | A * | 8/1998 | Baerlocher et al. | 463/16 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak et al. | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/ 16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/ 121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,276 | B1 * | 4/2001 | Mullins | 463/27 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 * | 5/2001 | Okuda et al. | 463/27 |
| 6,231,445 | B1 | 5/2001 | Acres | 463/42 |
| 6,241,608 | B1 * | 6/2001 | Torango | 463/27 |
| 6,254,483 | B1 | 7/2001 | Acres | 463/26 |
| 6,312,332 | B1 | 11/2001 | Walker et al. | 463/23 |
| 6,312,334 | B1 | 11/2001 | Yoseloff | 463/25 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,192 | B1 * | 7/2003 | Baerlocher et al. | 463/25 |
| 6,599,193 | B2 | 7/2003 | Baerlocher et al. | 463/27 |
| 6,601,771 | B2 | 8/2003 | Charrin | 235/492 |
| 6,648,754 | B2 * | 11/2003 | Baerlocher et al. | 463/17 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,780,103 | B2 * | 8/2004 | Bansemer et al. | 463/7 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 2002/0042297 | A1 * | 4/2002 | Torango | 463/27 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0048649 | A1 * | 3/2004 | Peterson et al. | 463/20 |
| 2004/0092304 | A1 | 5/2004 | George | 463/29 |
| 2005/0003880 | A1 | 1/2005 | Engleman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |

FOREIGN PATENT DOCUMENTS

| | | | | |
|---|---|---|---|---|
| CA | 2334546 | A1 | | 8/2001 |
| DE | 195 15 983 | A1 | | 11/1996 |
| DE | 196 24 321 | A1 | | 1/1998 |
| EP | 0 521 599 | A1 | | 1/1993 |
| EP | 1 380 998 | A2 | | 3/2003 |
| GB | 2 153 572 | A | | 8/1985 |
| GB | 2 181 589 | A | | 4/1987 |
| GB | 2 242 300 | A | | 9/1991 |
| GB | 2 313 792 | | | 6/1997 |
| GB | 2313792 | A | | 10/1997 |
| GB | 2 333 880 | | | 8/1999 |
| GB | 2353128 | A | * | 2/2001 |
| GB | 2 366 435 | | | 6/2001 |
| WO | WO 99/03078 | A1 | | 1/1999 |
| WO | WO 99/19037 | A1 | | 4/1999 |
| WO | WO 00/17832 | A1 | | 3/2000 |
| WO | WO 01/33478 | A1 | | 5/2001 |
| WO | WO/03/026754 | A1 | | 4/2003 |
| WO | WO 03/083789 | A1 | | 10/2003 |
| WO | WO/03/083789 | A1 | | 10/2003 |
| WO | WO 2004/023410 | A2 | | 3/2004 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

* cited by examiner

GAMING MACHINE HAVING MULTIPLE LEVEL PROGRESSIVE FEATURE WITH PLAYER CONTROLLED OUTCOME

FIELD OF THE INVENTION

The present invention relates generally to gaming machines and, more particularly, to a gaming machine and a gaming machine network having an enhanced progressive game in which the outcome is based on the selections made by the player.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed is the use of a progressive jackpot. In the gaming industry, a "progressive" involves the collecting of coin-in data from participating gaming device(s) (e.g., slot machines), contributing a percentage of that coin-in data to a jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain pay line. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. In the existing progressive games, the jackpot is awarded without the player interacting with the gaming machine. In other words, the player does not get the feeling that he or she has some sort of control over the outcome.

While the known player-appeal features provide some enhanced excitement, there is a continuing need to develop new features for progressive games to satisfy the demands of players and operators. Preferably, such new features for progressive games will further enhance the level of player excitement. The present invention is directed to satisfying these needs.

SUMMARY OF THE INVENTION

The present invention provides a new type of progressive game that can be used in conjunction with wagering games. This novel progressive game provides enhanced excitement by allowing the player to make selections during the progressive game that will determine the outcome of the progressive game.

Specifically, a gaming terminal is capable of playing a progressive game that is triggered during or after a wagering game played at the gaming terminal. The gaming terminal includes an input device for receiving inputs from a player during the wagering game. Such inputs include a wager amount. A display displays a randomly selected outcome of the wagering game in response to receiving the wager amount from the player. In response to the progressive game being triggered, the display then displays a plurality of player-selectable game elements. The player selects one or more of the player-selectable game elements and the progressive game payoff is determined based on his or her selection.

For example, the player-selectable game elements may be a large array of presents (e.g., 50 presents) that, upon being selected, are opened to reveal a certain outcome. Preferably, the progressive game is a multilevel progressive game and certain outcomes revealed from the selectable presents allow the player to achieve a higher level payoff in the progressive game.

The present invention also contemplates a novel method of playing a progressive game at a gaming terminal. The method involves receiving, from the gaming terminal, at least one player input during the progressive game. In response to receiving the player's input, the method includes determining whether the player input achieves a first progressive game payoff or a second progressive game payoff (which is greater than the first progressive game payoff), and awarding to the player a corresponding one of the first and second progressive game payoffs.

In one preferred embodiment, the progressive game is interconnected to several gaming terminals, all of which are competing for the payoff of the progressive game. Accordingly, players at these gaming terminals are able to select from a plurality of player-selectable game elements. In this embodiment, signage located above the gaming terminals may also display the player's selections of the player-selectable gaming elements as they are being selected so that all players competing for the payoff can observe the outcome achieved by the player engaged in the progressive game.

The above summary of the present invention is not intended to represent each embodiment or every aspect of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
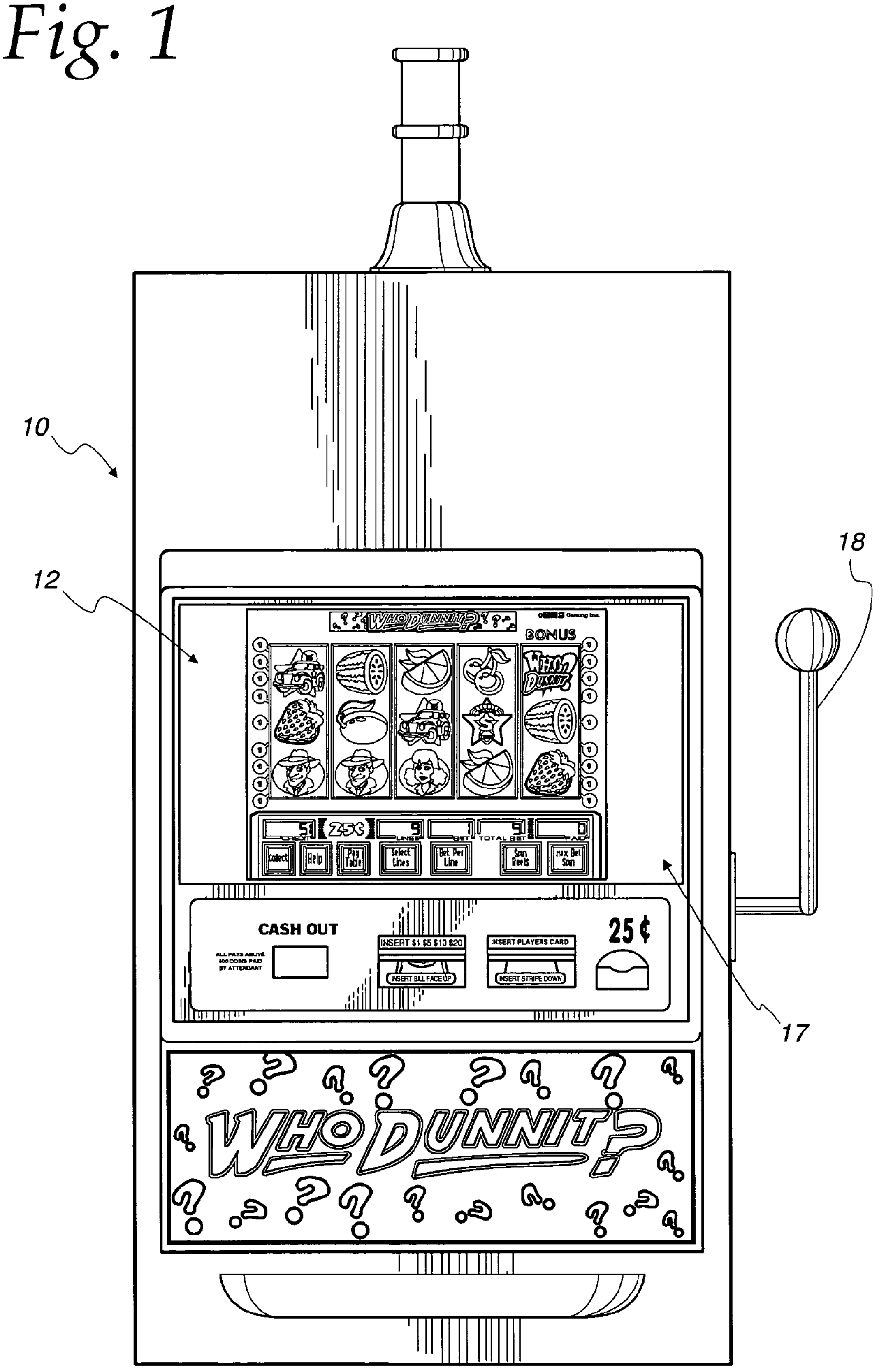
FIG. 1 is a simplified front view of a slot machine that is used with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that may be used to implement the enhanced progressive game according to the present invention. The gaming machine 10 includes a video display 12 that may comprise a CRT, LCD, plasma, LED, electro-luminescent display, or generally any type of video display known in the art. In the illustrated embodiment, the gaming machine 10 is an "upright" version in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical, rather than video, displays.

In one embodiment, the gaming machine 10 is operable to play a game entitled WHO DUNNIT?™ having a mystery theme. The WHO DUNNIT?™ game features a basic game in the form of a slot machine with five simulated spinning reels and a bonus game with selection options directing game activities on the video display 12. Such a gaming machine is disclosed in detail in U.S. Publication No. US 2002/0090990 A1, which is incorporated herein by reference in its entirety. It will be appreciated, however, that the gaming machine 10 may be implemented with games other than the WHO DUNNIT?™ game and/or with several alternative game themes.

Figure 2:
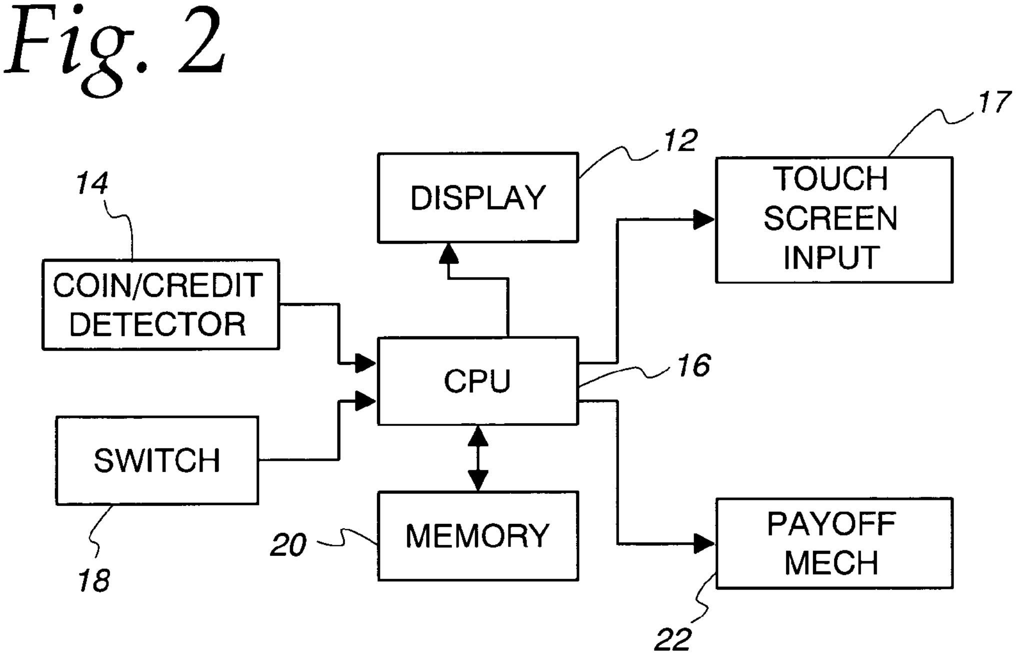
FIG. 2 is a block diagram of a control system suitable for operating the gaming machine in FIG. 1.

FIG. 2 is a block diagram of a control system suitable for operating the gaming machine 10 of FIG. 1. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select the number of paylines to play and the amount to wager via touch screen input keys 17 (FIG. 1). The basic game commences in response to the player activating a switch 18 (FIG. 1) in a lever or push button, causing the CPU 16 to set the reels in motion, randomly select a game outcome, and then stop the reels to display symbols corresponding to the pre-selected game outcome. Preferably, certain basic game outcomes cause the CPU 16 to enter a bonus mode, which causes the video display 12 to show a bonus game, as is known in the art.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes that may occur in the basic game or bonus game. The payoff amounts corresponding to certain combinations of symbols in the basic game are predetermined according to a pay table stored in the system memory 20. The payoff amounts corresponding to certain outcomes of the bonus game are also stored in system memory 20.

The gaming machine 10 of FIGS. 1 and 2 is a gaming terminal that receives inputs from players, randomly selects game outcomes, and displays those outcomes, as controlled by the internal CPU 16. It will be appreciated, however, that the present invention can be used by a gaming terminal that receives player inputs and displays game outcomes under the control of an external CPU.

While the gaming machine 10 of FIGS. 1 and 2 has been described by itself, the gaming machine 10 is connected to a progressive game into which several gaming machines are linked, as will be described below. It should be understood, however, that the novel progressive game feature that includes player-selectable game elements within the progressive game is useful on a stand-alone gaming machine 10 that is not connected to other gaming machines. If the gaming machine is a stand-alone progressive game, it will include some display elements indicating the jackpot amount or amounts associated with the progressive game.

Figure 3:
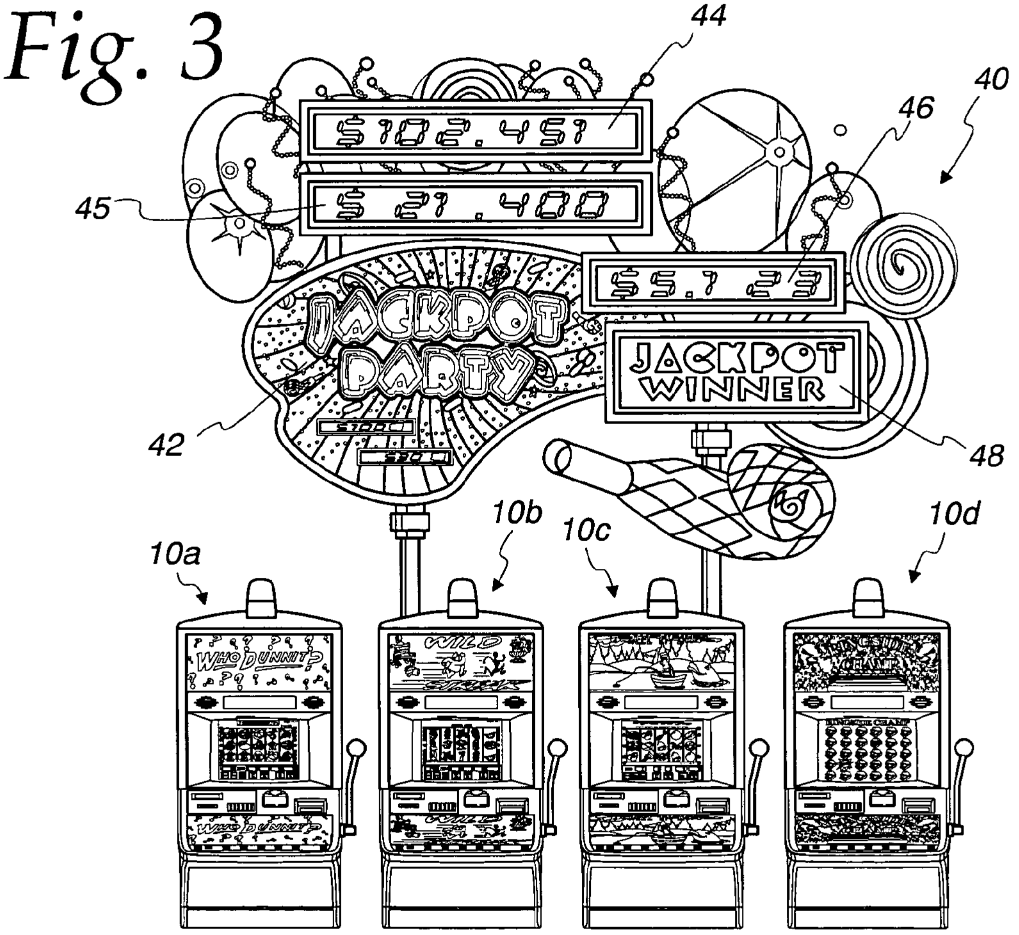
FIG. 3 illustrates one embodiment of a gaming system including four gaming machines that are linked to a common progressive game.

Referring now to FIG. 3, a gaming system 40 includes four gaming machines 10*a*, 10*b*, 10*c*, 10*d*, which are of the type described above with respect to FIGS. 1 and 2. The gaming system 40 also includes signage 42, which is adjacent and connected to the four gaming machines 10*a*, 10*b*, 10*c*, 10*d*. The signage 42 displays certain aspects of the progressive game, which at least includes the jackpot amount that can be won during the progressive game.

Preferably, the progressive game is a multi-level progressive game. In the illustrated embodiment, there are four progressive levels: a Party Level, a Super-Party Level, a Blowout-Party Level, and a Mega-Party Level. To display the various jackpot levels, the signage 42 includes a first display 44, a second display 45, a third display 46, and a fourth display 48. The first display 44 shows the amount of the Mega-Party Level, which is $102,451 in the illustrated embodiment. The second display 45 shows the amount of the Blowout-Party Level, which is $21,400. The third display 46 shows the amount of the Super-Party Level, which is $5,123. Finally, the fourth display 48 shows the amount of the Party Level, which has been won by one of the players of the four gaming machines 10*a*, 10*b*, 10*c*, 10*d* and is currently displaying "Jackpot Winner."

The signage 30 may include its own controller that is connected to each of the four gaming machines 10*a*, 10*b*, 10*c*, 10*d*. The signage controller transmits information to and receives information from the CPU 16 (FIG. 2) in each of the four gaming machines 10*a*, 10*b*, 10*c*, 10*d* throughout the progressive game. Thus, the CPUs 16 (FIG. 2) of the gaming machines 10*a*, 10*b*, 10*c*, 10*d* may determine when a progressive game has been triggered after or during a typical basic game or bonus game being played at one of the gaming machines 10*a*, 10*b*, 10*c*, 10*d*. Once triggered, however, the signage controller then controls the playing of the progressive game. For example, the signage controller may send high-level signals to the CPU 16 at the winning gaming machines 10*a*, 10*b*, 10*c*, 10*d* instructing the CPU 16 on what to illustrate on its display 12.

Alternatively, other control system architectures can be used in the gaming system 40 that will still provide the novel progressive game, which is described in more detail below with respect to FIGS. 4-12. For example, the memory 20 (FIG. 2) of each gaming machine 10*a*, 10*b*, 10*c*, 10*d* may include the software for running the progressive game. The gaming machines 10*a*, 10*b*, 10*c*, 10*d* could communicate with each other to provide instructions that a progressive game is being actuated and, thus, no other gaming machine can enact the progressive game until the current progressive game session is complete. The gaming machines 10*a*, 10*b*, 10*c*, 10*d* could communicate real-time updates to the linked jackpots that are then updated on the displays 12 of the gaming machines 10*a*, 10*b*, 10*c*, 10*d*.

As shown in FIG. 3, the gaming system 40 contemplates a progressive game that is played by several different types of gaming machines 10*a*, 10*b*, 10*c*, 10*d*. In other words, each of the gaming machines 10*a*, 10*b*, 10*c*, 10*d*, although different in theme and playing features, has a triggering event that is randomly selected, allowing for players at each of these gaming machines 10*a*, 10*b*, 10*c*, 10*d* to qualify for the progressive game.

Figure 4:
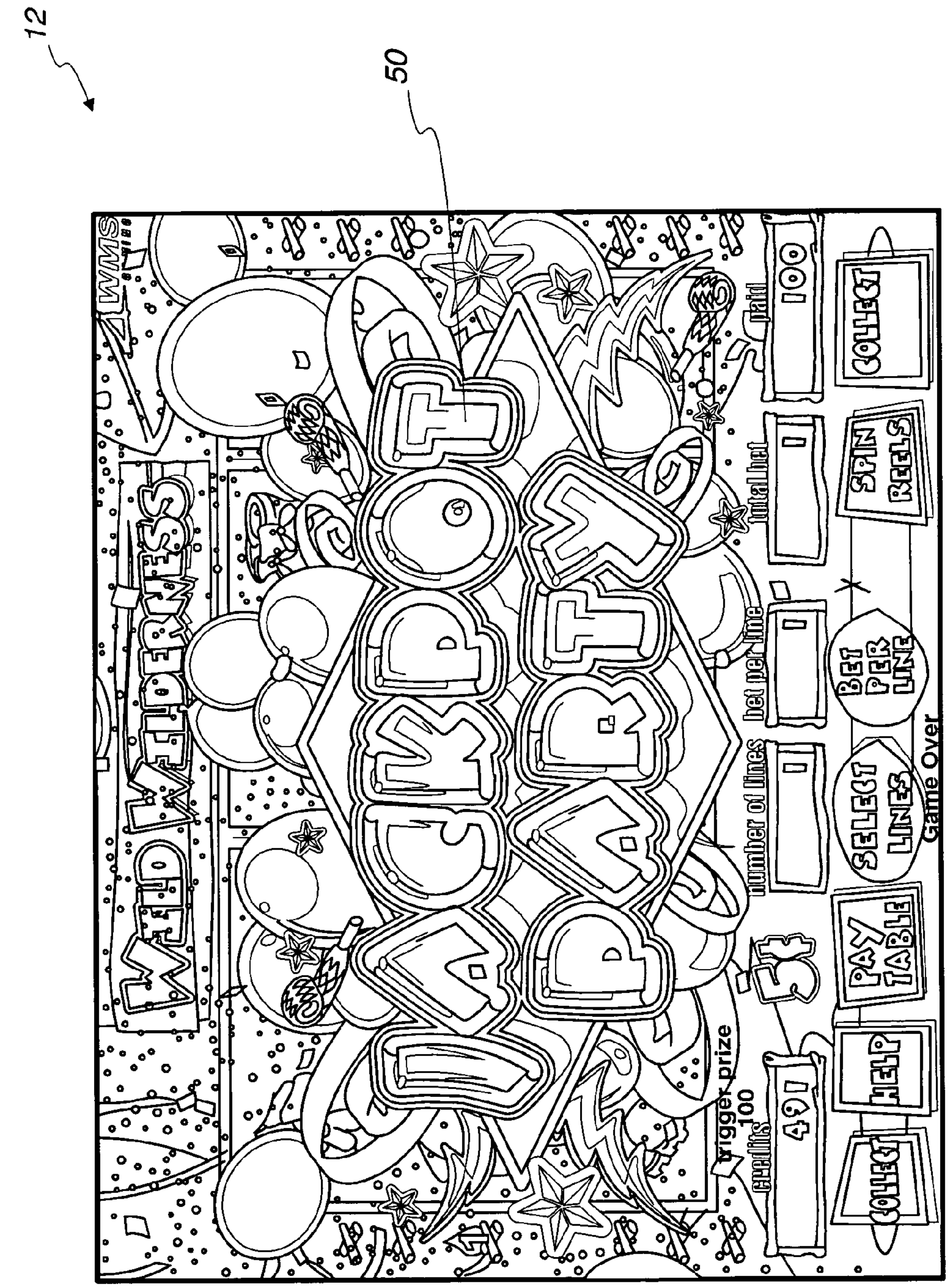
FIG. 4 illustrates the display of the gaming machine of FIG. 1 when the progressive game has been enacted.
Figure 5:
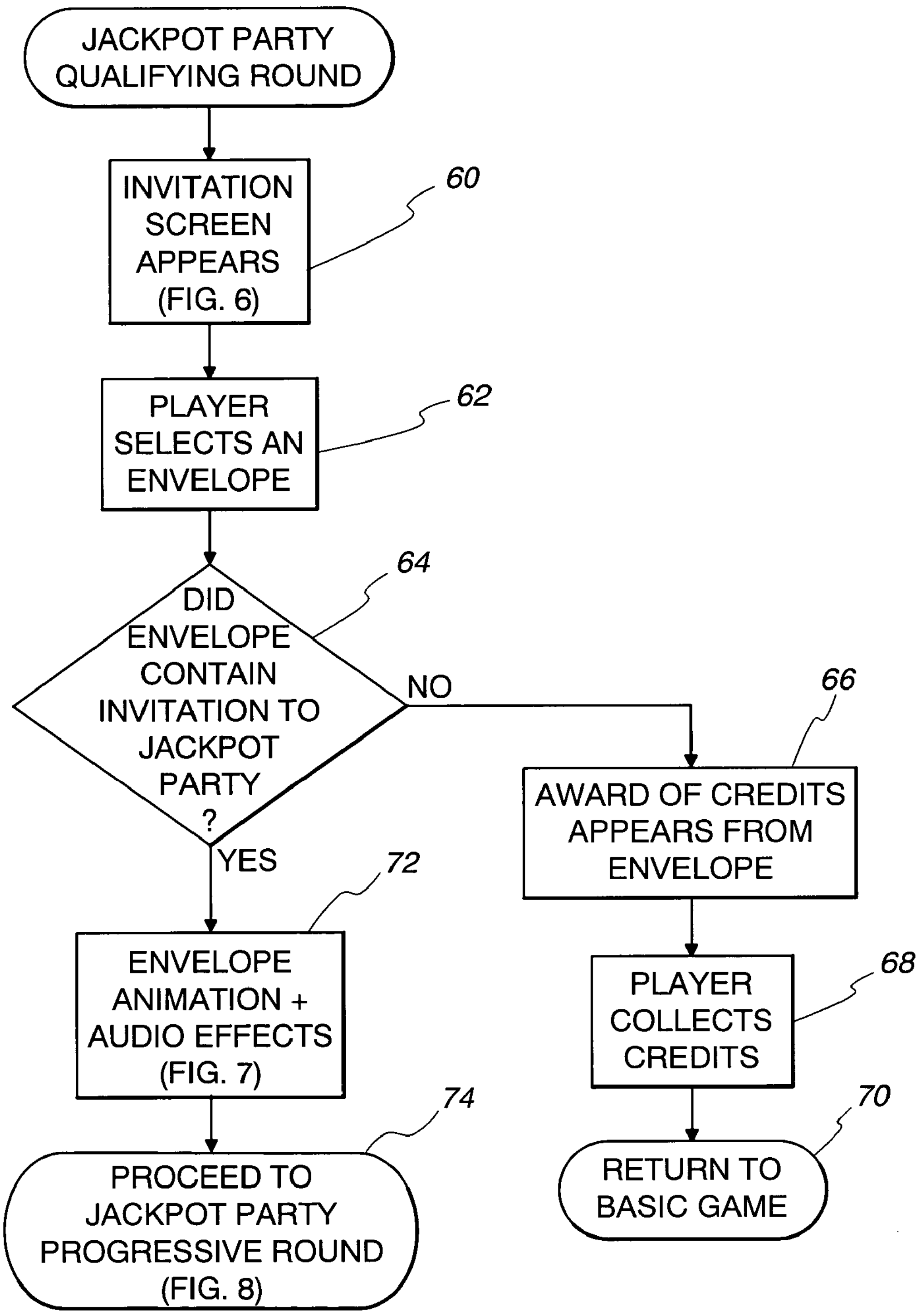
FIG. 5 illustrates a flow chart of the qualifying round of the progressive game.

Turning to FIG. 4, when the gaming machine 10 determines that a player has advanced to a progressive game, the display 12 illustrates a message 50 to inform the player. The message 50 is usually accompanied by special audio effects, as well. In one embodiment, when the gaming machine 10 is a slot machine having multiple pay lines, a player must be playing the maximum number of pay lines to be eligible for the progressive game. If the players are playing the maximum number of pay lines, the CPU 16 randomly determines whether the player is to play the progressive game. If chosen, the player enters a qualifying round, which is shown in FIG. 5. If the player wins the qualifying round, he or she then advances to the progressive game (FIG. 8) which, at a minimum, will award the player the lowest jackpot level of the multilevel progressive game.

Figure 6:
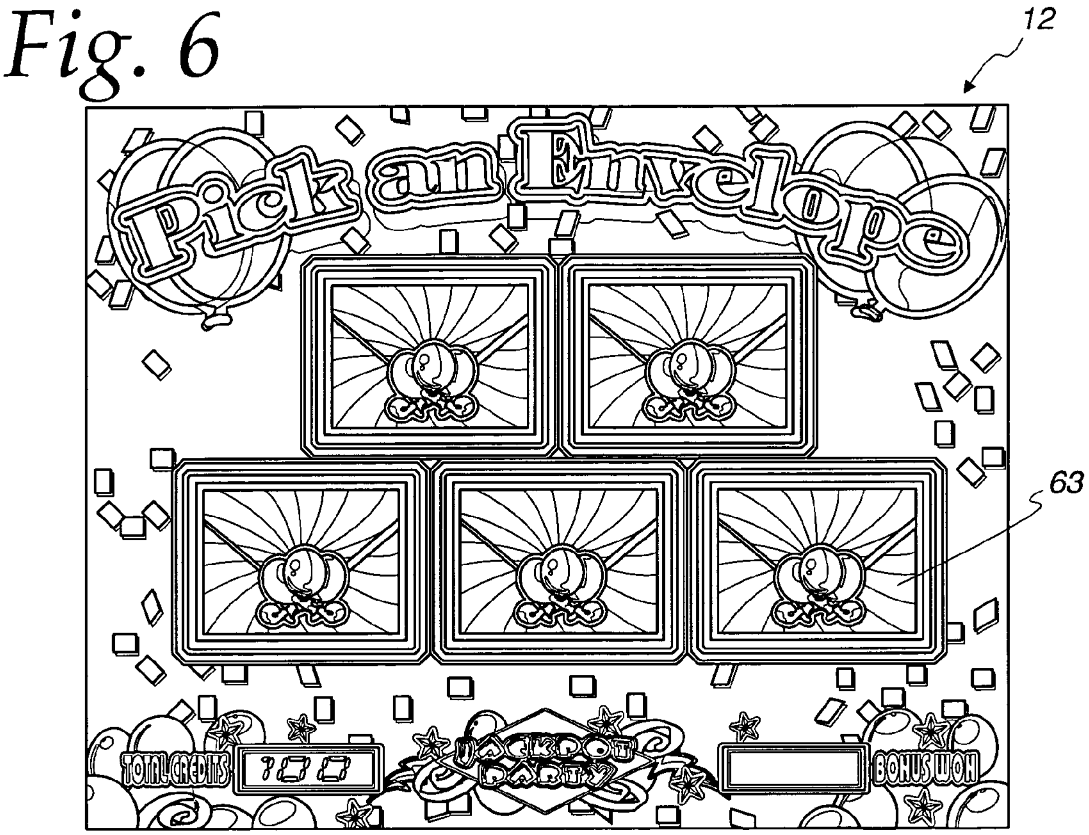
FIG. 6 illustrates the qualifying round described in FIG. 5 in which a player selects a certain envelope that reveals whether the player is eligible for the progressive game.

FIG. 5 illustrates a flow chart of the qualifying round of the progressive game. At step 60, after instructing the player that he or she is eligible for the progressive game via the display 12 (see FIG. 4), an invitation screen appears on the display 12. One example of this type of invitation screen is shown in FIG. 6. At step 62, the player selects one of five envelopes 63 (FIG. 6) by activating an input device (e.g., a touch screen) on the gaming machine 10.

At step 64 in FIG. 5, the CPU operating the progressive game determines whether the selected envelope 63 (FIG. 6) contains an invitation to the progressive game. If the answer to the inquiry at step 64 is "no," the envelope contains an additional game credit so that the player at least wins a game credit when the qualifying round is triggered. Accordingly, at step 66, an award of credits appears from the envelope that was selected. The player then collects the credit at step 68. Finally, the gaming machine 10 returns to the basic game at step 70 and the player continues playing the wagering game at the gaming machine, if he or she so desires, with the additional credit achieved during the qualifying round of the progressive game.

Figure 7:
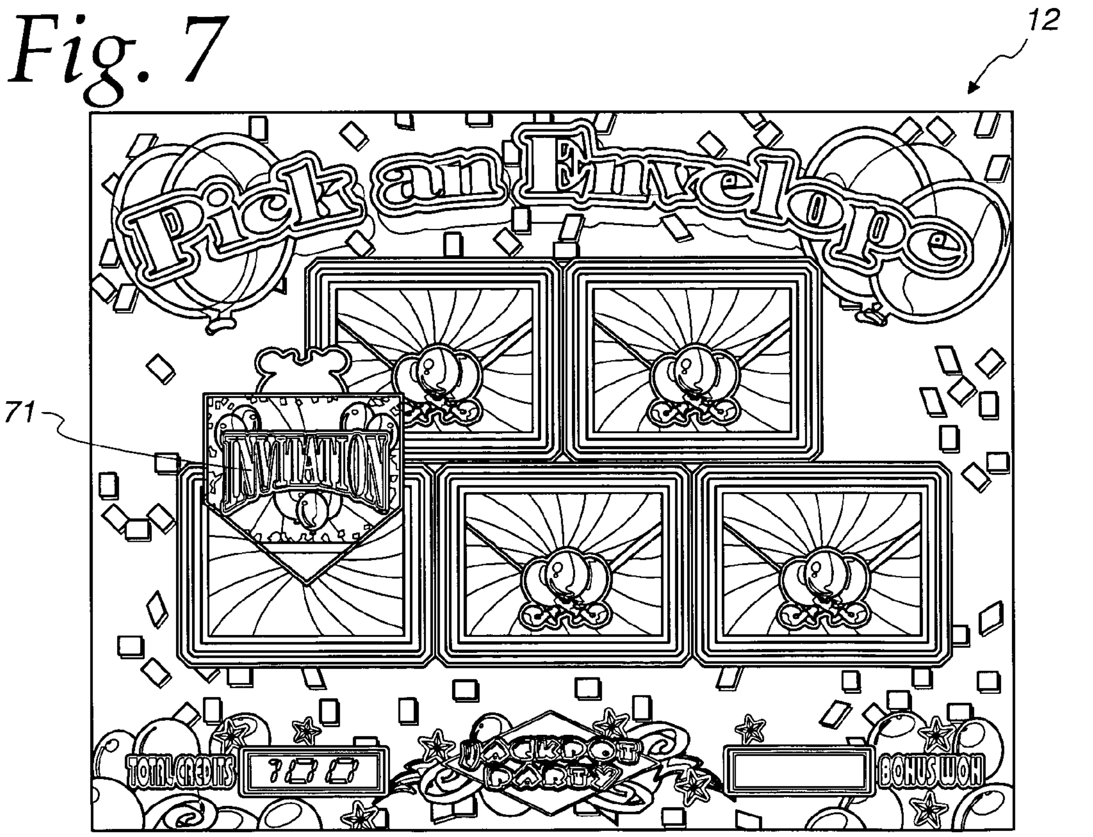
FIG. 7 illustrates that the player in the qualifying round of FIG. 5 has selected an envelope containing an invitation to play in the progressive game.

On the other hand, if the answer at step 64 is "yes," then at step 72, the envelope 63 (FIG. 6) containing the invitation becomes animated and certain audio effects take place so that the player understands that he or she has been invited to the progressive game. FIG. 7 illustrates one possible scenario of an invitation 71 to the progressive game, as illustrated on the display 12 of the gaming machine 10. Finally, the qualifying round, at step 74, proceeds to the progressive game round, which is illustrated in flow diagram form at FIG. 8.

In summary, FIGS. 5-7 illustrate a qualifying round of a progressive game that must be won before allowing for the ability to win the progressive jackpot(s). This qualifying round includes player-selectable game elements allowing the player, via his or her selection of these game elements, to enter or qualify for the progressive jackpot. These player-selectable, progressive game entry elements, which are shown as five envelopes, can be in various forms that are selectable by the player. For example, the player-selectable progressive game entry elements can be in the form of presents that are opened to reveal whether the player advances to play for the jackpot.

The qualifying round of FIGS. 5-7 also provides a "gate" feature for gaming machine operators and manufacturers in that they can reward players who are wagering higher amounts per pay line in the basic game with a better chance to enter the progressive game. For example, if the player is only wagering one credit per pay line, then only one of the envelopes 63 in FIG. 6 may contain an invitation. On the other hand, if the player is wagering five or more credits per pay line, then all five of the envelopes 63 in FIG. 6 will contain an invitation so that the player is guaranteed a chance at the progressive game jackpot.

Figure 8:
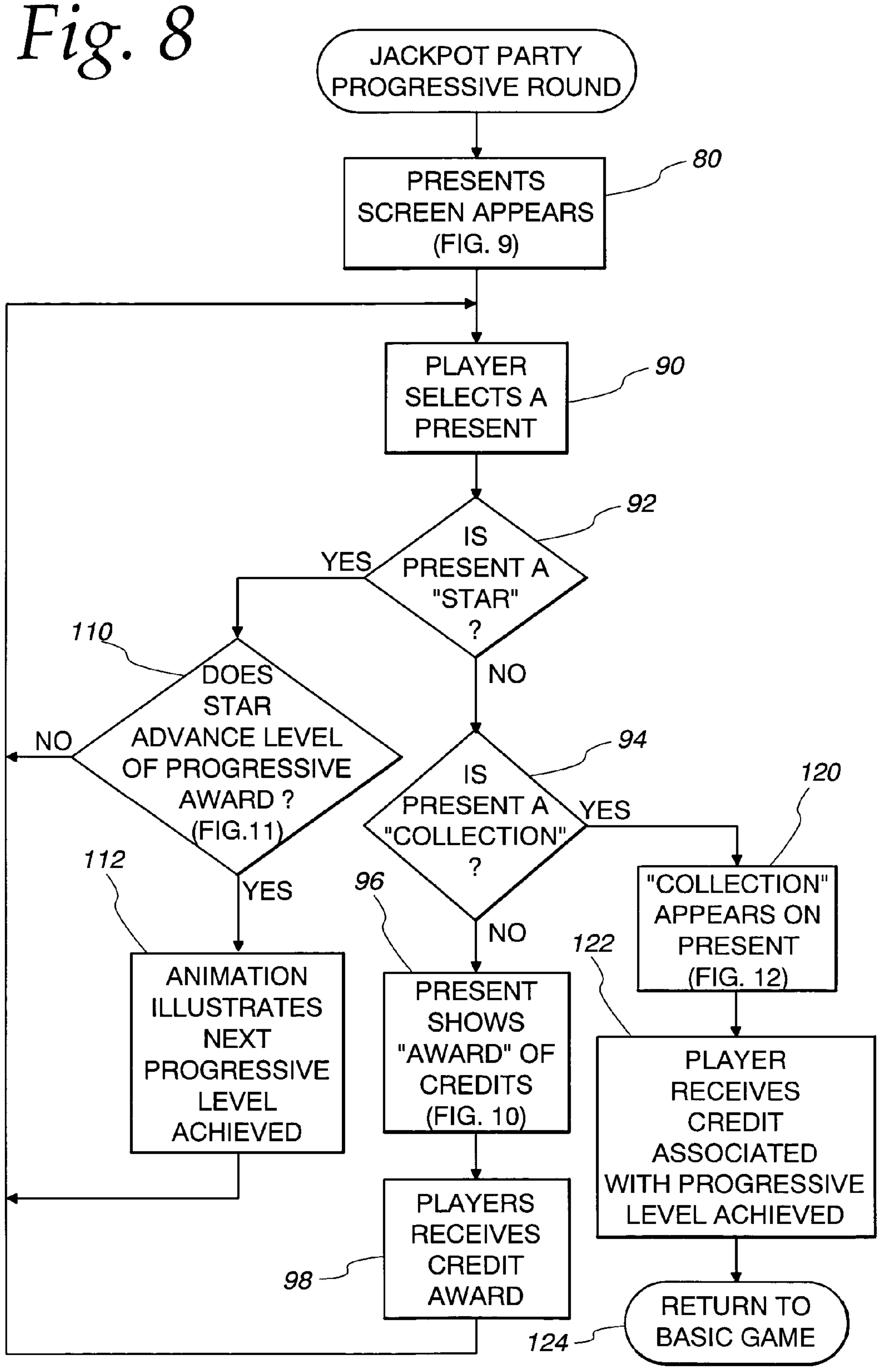
FIG. 8 illustrates a flow chart of the progressive game.

FIG. 8 illustrates the flow diagram for the progressive round that is engaged after the qualifying round of FIG. 6 is won. FIG. 8 will be discussed with reference to FIGS. 9-12, which illustrate the display 12 of the gaming machine 10 at various stages is of the progressive game.

Figure 9:
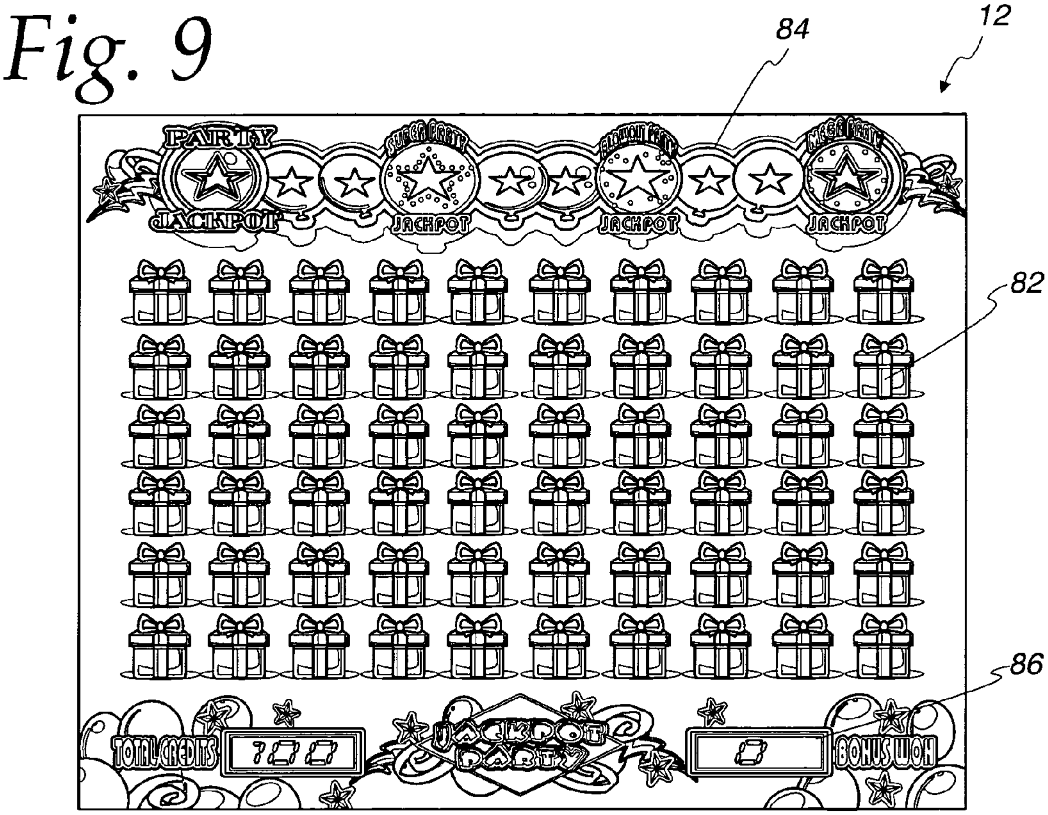
FIG. 9 illustrates the display having a plurality of player-selectable presents, which are selected by the player during the progressive game, as described in FIG. 8.

At step 80 in FIG. 8, a plurality of player-selectable game elements, shown in FIG. 9 as a plurality of presents 82, appear on the display 12 of the gaming machines 10. In this embodiment, the progressive game is a multilevel progressive game in that there are four different jackpots that can be awarded. Accordingly, at the top of FIG. 9, a progressive level indicator 84 indicates the player's advancement to the various jackpots as the player selects the presents 82. As discussed below, when the player selects a certain present 82 that is a level-increasing element (i.e., a "star"), the progressive level indicator 84 will change to reflect the selection of the level-increasing element.

Figure 10:
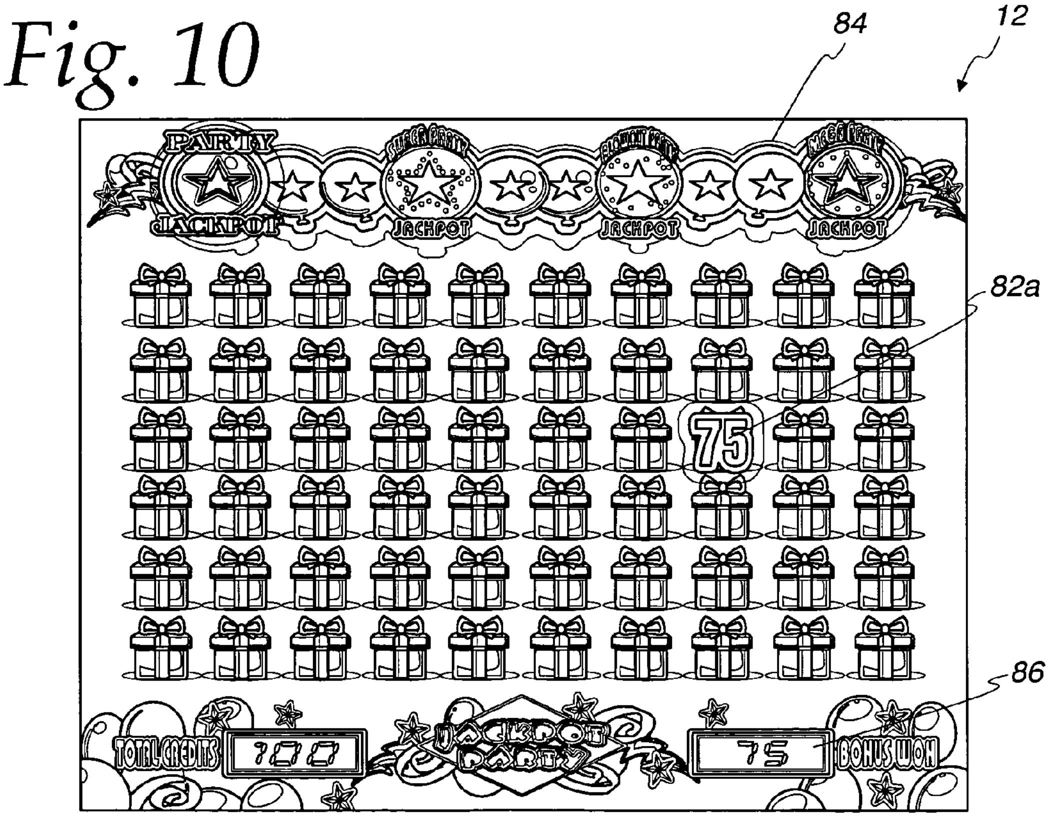
FIG. 10 illustrates the selection of a certain present yielding a "credit" game element, as described in FIG. 8.

At step 90 in FIG. 8, the player selects one of the presents. The CPU operating the progressive game determines whether the present is a level-increasing element that advances the player towards the next level of the jackpot of the progressive game. This occurs at step 92, where the level-increasing element is a "star" symbol. If the answer at step 92 is "no," then the CPU that operates the progressive game inquires at step 94 whether the player-selectable element is a "collect" element, which ends the player's ability to select features during the progressive round. If the answer at step 94 is "no," then at step 96, a credit award appears behind the present, as shown in FIG. 10, where the present 82*a* reveals a credit award of 75 credits. At step 98, this credit award is then reflected in the credit meter 86 located at the bottom right corner of the display 12.

Figure 11:
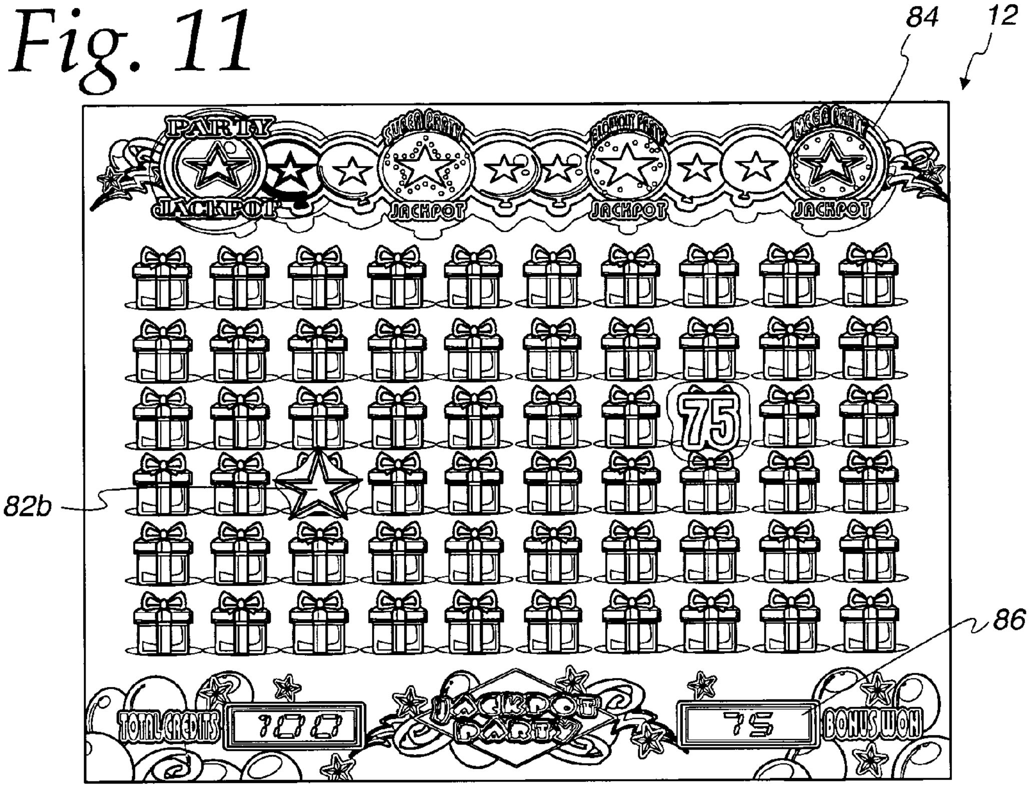
FIG. 11 illustrates the selection of a "star" game element, which moves the progressive jackpot award indicator at the top of the display closer to the second level of the progressive game.

If the player achieves a credit award, then he or she is allowed to select another present, which returns the flow chart to step 90. Upon selecting the second present, the logic repeats at step 92 to determine whether a "star" symbol has been selected. If the answer at step 92 is "yes," then at step 110, the CPU determines whether the star advances the player to the next level of progressive jackpots. If the answer is "no" at step 110, then the flow chart returns to step 90 and a player selects another present and the progressive level indicator 84 advances one "star" toward the next level jackpot. The selection of the "star" is shown in FIG. 11 as the present 82*b* has been selected, causing the second star on the progressive level indicator 84 to be highlighted. Accordingly, only two more stars are needed to advance the player to the second level, the Super-Party Jackpot.

If the answer is "yes" at step 110, then at step 112, the display 12 provides enhanced animation that instructs the player that he or she has reached the next level of jackpot. Enhanced audio effects would be applied, as well. The progressive game then returns to step 90 where the player again selects another present. In essence, a selection of a star symbol or a credit award allows the player to continue making selections during the progressive game.

Figure 12:
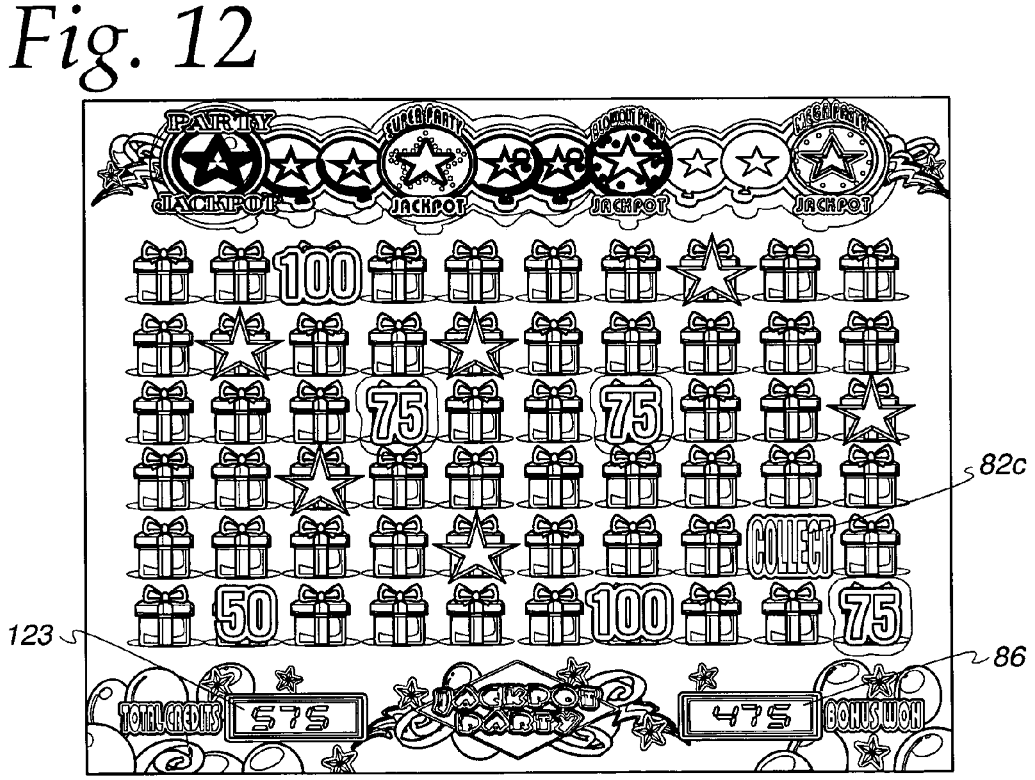
FIG. 12 illustrates the selection of the "collect" game element after the player has previously selected twelve other awards or stars during the progressive game.

Continuing with FIG. 8, after steps 92 and 94, if it is determined that a "collect" game element has been selected, the progressive game comes to an end (i.e., the "collect" element is a stop-game element). One example of this scenario is shown in FIG. 12 in which the present 82*c* has been selected to reveal the "collect" game element. At this point, the player has selected thirteen different player-selectable game elements (i.e., presents 82) and has achieved 475 credit awards, as shown in the credit meter 86. In addition, the player has selected six level-increasing elements (i.e., "stars"), advancing the jackpot level to the third level, which is the Blowout-Party Jackpot. Accordingly, assuming the progressive jackpots had advanced in the manner shown in FIG. 3, the player would be awarded the Blowout-Party Jackpot of $21,400, as shown in the second display 46 of the signage 42 of FIG. 3, plus the 475 credits in the credit meter 86.

Completing the flow diagram, at step 122 of FIG. 8, the player then receives all credits associated with the progressive game, which is the jackpot plus the credit awards in the bonus credit meter. In FIG. 12, the bonus credit meter 86, with a value of 475, is added to the overall game credit meter 123 (which had 100 credits), thereby yielding a total game credit of 575 credits. The Blowout-Party Jackpot can be awarded separately because of its large amount. At step 124, the gaming machine 10 returns to the normal operational mode and begins applying the basic game.

In the embodiments shown in FIGS. 5-12, the CPU performing the various progressive game functions can be the CPU located within each associated gaming machine 10*a*, 10*b*, 10*c*, 10*d*. Thus, each gaming machine 10*a*, 10*b*, 10*c*, 10*d* would have the same software associated with the progressive round (and also the qualifying round). Alternatively, the CPU may be external to the gaming machines, such as one associated with the signage 42 (FIG. 3) displaying the play of the progressive game.

In an alternative embodiment, the progressive game with all of its illustrated messages and player-selectable elements, as shown in FIGS. 4, 6, 7 and 9-12, can also be illustrated on one of the displays 44, 45, 46, 48 of the signage 42 in FIG. 3. Alternatively, a special display can be provided to illustrate these features of the progressive game. Therefore, all of the players of the gaming machines 10*a*, 10*b*, 10*c*, 10*d* can observe the actions of one player who is engaged in the progressive game. In doing so, the progressive game may also provide the ability for players of the other machines 10*a*, 10*b*, 10*c*, 10*d* to make suggestions to the player engaged in the progressive game on which player-selectable elements to choose next.

Further, the gaming system 40 of FIG. 3 may be structured to display the same images of the progressive game on all of the gaming machines 10*a*, 10*b*, 10*c*, 10*d* after one of the gaming machines 10*a*, 10*b*, 10*c*, 10*d* has engaged in a progressive game. Thus, players of the other non-progressive gaming machines can select certain presents 82 (FIGS. 9-12), which will appear on the display on the signage 42 as a circle or other indicator showing which presents the non-progressive player believes should be selected next. In other words, the player engaged in the progressive game can look at the display on the signage 42 and determine which of the presents 82 the other players believe he or she should select next to further advance the progressive game. While these circles or other indicators have no bearing on the outcome of the progressive game, this feature provides for enhanced player excitement as each of the players at the gaming machines 10*a*, 10*b*, 10*c*, 10*d* feels as though they have some stake in the outcome.

In another format for the progressive round, the presents may include symbols for all four jackpot levels. The player then selects the presents until three of the same symbols are displayed. The player is then awarded the amount of the jackpot associated with the particular symbol that was revealed three times. Again, this progressive game format provides increased excitement as the player feels that he or she has control over the outcome by selecting these player-selectable game elements While the present invention has been described with reference to one or more particular embodiments, those skilled in the art will recognize that many changes may be made thereto without departing from the spirit and scope of the present invention. For example, the gaming machine 10 may have only a basic game, such that the novel progressive game is the secondary or bonus game. Each of these embodiments and obvious variations thereof is contemplated as falling within the spirit and scope of the claimed invention, which is set forth in the following claims.

What is claimed is:

1. A method of conducting a progressive feature triggered during play of a wagering game played at a gaming terminal, the progressive feature including a first progressive award funded at least partially by a portion of wagers received at the gaming terminal, the method comprising:

displaying, on a display, player-selectable icons concealing respective elements in a first field of elements including progressive award elements, fixed award elements, and end-feature elements;

allowing a player to non-randomly, successively select, via a player input device, one or more of the icons to reveal the respective concealed elements until a predetermined number of progressive award elements or at least one end-feature element is revealed, whichever occurs first;

awarding, via one or more processors, the first progressive award and any fixed awards associated with any selected fixed award elements, if the predetermined number of progressive award elements are selected prior to the at least one end-feature element; and awarding, via the one or more processors, any fixed awards associated with any selected fixed award elements but not awarding the first progressive award, if the at least one end-feature element is selected prior to the predetermined number of progressive award elements.

2. The method of claim 1, wherein the progressive feature includes a second progressive award funded at least partially by a portion of wagers received at the gaming terminal, and wherein if and only if the first progressive award is awarded, repeating the displaying, allowing, awarding, and awarding steps with respect to a second field of elements and the second progressive award.

3. The method of claim 2, wherein the second progressive award is greater than the first progressive award.

4. The method of claim 1, wherein the elements include a continue-game element.

5. The method of claim 4, wherein selecting one of the continue-game elements increases the first progressive award.

6. The method of claim 4, further comprising awarding a second progressive award, the second progressive award being higher than the first progressive award, by selecting a predetermined number of the continue-game elements.

7. The method of claim 1, wherein triggering the progressive feature includes selecting from a plurality of progressive game qualifying items, at least one of the plurality of progressive game qualifying items permitting entry to said progressive game.

8. The method of claim 7, wherein the progressive game qualifying items are video envelopes that are selectable by a player at the gaming terminal, the at least one of the plurality of progressive game qualifying items including an invitation therein that is displayed in response to the player selecting the at least one of the plurality of progressive game qualifying items.

9. A gaming system for conducting a progressive feature triggered during play of a wagering game played at a gaming terminal, the progressive feature including a first progressive award funded at least partially by a portion of wagers received at the gaming terminal, the system comprising:

a display for displaying player-selectable icons concealing respective elements in a first field of elements including progressive award elements, fixed award elements, and end-feature elements;

a player input device allowing a player to non-randomly, successively select one or more of the icons in the first field to reveal the respective concealed elements until a predetermined number of progressive award elements or at least one end-feature element is revealed, whichever occurs first; and one or more processors coupled to the display and the player input device, the processor operative to:

award the first progressive award and any fixed awards associated with any selected fixed award elements if the predetermined number of progressive award elements are selected prior to the at least one end-feature element; and award any fixed awards associated with any selected fixed award elements but not awarding the first progressive award if the at least one end-feature element is selected prior to the predetermined number of progressive award elements.

10. The system of claim 9, wherein the progressive feature includes a second progressive award funded at least partially by a portion of wagers received at the gaming terminal, and wherein if and only if the first progressive award is awarded, the display displays player-selectable icons concealing respective elements in a second field of elements including progressive award elements, fixed award elements, and end-feature elements, the player input device allows the player to successively select one or more of the icons in the second field to reveal the respective concealed elements until a predetermined number of progressive award elements or at least one end-feature element is revealed, and the processor is operative to award the second progressive award and any fixed awards associated with any selected fixed award elements if the predetermined number of progressive award elements are selected prior to the at least one end-feature element, and award any fixed awards associated with any selected fixed award elements but not awarding the second progressive award if the at least one end-feature element is selected prior to the predetermined number of progressive award elements.

11. The system of claim 10, wherein the second progressive award is greater than the first progressive award.

12. The system of claim 9, wherein the elements include a continue-game element.

13. The system of claim 12, wherein the processor is operative to increase the first progressive award in response to selecting one of the continue-game elements.

14. The system of claim 12, wherein the processor is operative to award a second progressive award, the second progressive award being higher than the first progressive award, in response to selecting a predetermined number of the continue-game elements.

15. The system of claim 9, wherein triggering the progressive feature includes selecting from a plurality of progressive game qualifying items on the display, at least one of the plurality of progressive game qualifying items permitting entry to said progressive game.

16. The system of claim 15, wherein the progressive game qualifying items are video envelopes that are selectable by a player at the gaming terminal, the at least one of the plurality of progressive game qualifying items including an invitation therein that is displayed in response to the player selecting the at least one of the plurality of progressive game qualifying items.

* * * * *